March 16, 1965   A. G. STIMSON ETAL   3,173,347
AUTOMATIC EXPOSURE CONTROL FOR A CAMERA
Filed March 6, 1963
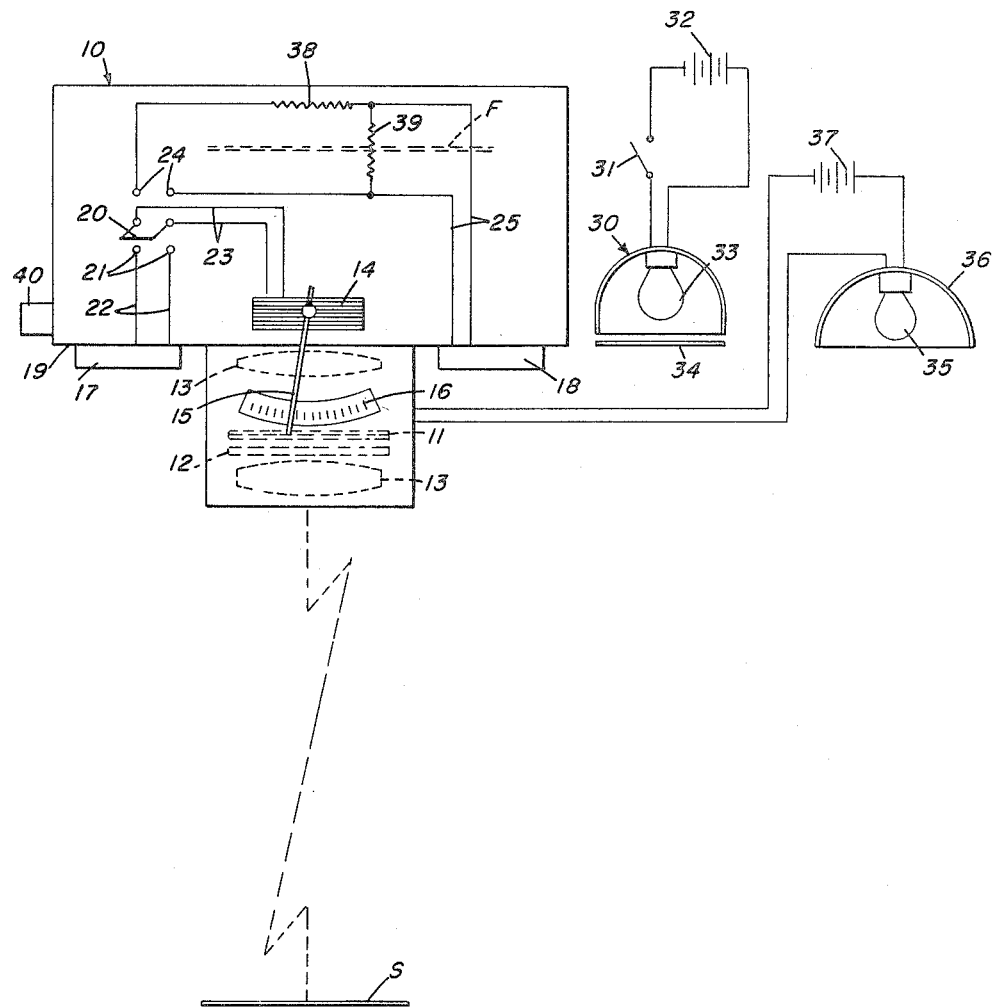
ALLEN G. STIMSON
JOHN H. EAGLE
INVENTORS
BY
ATTORNEY & AGENT United States Patent Office 3,173,347
Patented Mar. 16, 1965

3,173,347
AUTOMATIC EXPOSURE CONTROL FOR
A CAMERA
Allen G. Stimson and John H. Eagle, Rochester, N.Y.,
assignors to Eastman Kodak Company, Rochester,
N.Y., a corporation of New Jersey
Filed Mar. 6, 1963, Ser. No. 263,257
16 Claims. (Cl. 95—10)

The present invention relates to an automatic exposure control system for a camera, and more particularly to an exposure control system in which a measuring instrument is selectively energized by a visible light-sensitive photocell for daylight operation or by an infrared light-sensitive photocell for flash operation.

It is well known in the camera art that an exposure control system for a still camera can be either of the manual or automatic type. In a manual type of exposure control system, an exposure meter comprising a photoelectric cell and an electrical measuring instrument can be a separate device or incorporated in the camera. The device or camera is directed toward the subject to be photographed, and the light value measured by the exposure meter is then an indication of the diaphragm opening or exposure aperture to be used for an optimum exposure of the film. The operator then manually sets the camera diaphragm opening in accordance with the value indicated by the exposure meter either by setting a member relative to a scale on the camera or a member in registry with the output member of the exposure meter. In an automatic type of exposure control system, the exposure meter is built into the camera and the output member of the measuring instrument can be coupled directly to the diaphragm actuating mechanism to adjust the diaphragm opening, or such mechanism can include a sensing member that is movable into engagement with the output member to establish the diaphragm opening. In either case, the operator directs the camera toward the subject to be photographed and the light incident on the photocell energizes the measuring instrument to position the output member as a function of the scene brightness. If the system is coupled directly to the diaphragm, the diaphragm opening is adjusted under direct control of the output member, the exposure being made upon actuation of the shutter. If the system is not directly coupled, actuation of the shutter first releases the sensing member for movement toward the output member to establish the diaphragm opening, and with further movement of the shutter release member, the shutter is actuated to complete the exposure.

When the above-described automatic exposure control systems are used for flash operation, such systems are usually disconnected or disabled so as to permit the operator to adjust the diaphragm manually. As a result, the diaphragm opening is adjusted by manually setting a diaphragm actuating member with respect to a diaphragm scale on the camera, such opening being in accordance with a recommended subject to camera distance.

The present invention eliminates the need for disconnecting or disabling the automatic exposure control system as well as any manual setting of the diaphragm for flash operation. As a matter of fact, the invention uses the same diaphragm actuating mechanism that is used in the course of normal daylight operation. This is accomplished by providing the camera with two photocells, one being sensitive to visible light or daylight and the other being sensitive to infrared light. The photocells can be selectively interconnected to the measuring instrument which positions the output member as a function of scene brightness, in the visible spectrum or in the infrared spectrum according to the photocell connected thereto. A preferred form of the invention uses an additional source of illumination to produce infrared light for illumination of the subject. The infrared light reflected from the subject and incident on the infrared light-sensitive photocell energizes the measuring instrument, which positions the output member in accordance with the infrared light incident on the cell and the exposure is then made by illuminating the subject with a photoflash lamp which is connected to the camera shutter so as to be energized in synchronism therewith in a well-known manner.

An object of the invention is to provide an automatic exposure control system for a camera which can be used for either daylight or flash operation. Another object of the invention is to provide an automatic exposure control system for a camera in which the output member is positioned to establish or adjust the diaphragm opening by a photocell responsive to visible or daylight or by a photocell responsive to infrared light. Still another object of the invention is to provide an automatic exposure control system for a camera in which the means for energizing the measuring instrument can be selectively connected thereto in accordance with either a daylight or a flash mode of operation.

Other objects and advantages of the invention will be apparent to those skilled in the art by the description which follows.

Reference is now made to the accompanying drawing wherein like reference numerals designate like parts and wherein a schematic arrangement of a camera embodying the invention is shown together with the sources of illumination used in conjunction therewith.

A camera 10 is shown schematically in the drawing and can be of a type having a diaphragm 11 and a shutter 12 arranged between the elements of an objective 13. Such a diaphragm and shutter structure is well known in the art, and the diaphragm 11 can be of a type as shown, for example, in any one of U.S. Patents 2,926,571; 2,999,440 and 3,016, 811; and U.S. patent application Serial No. 205,588, now Patent No. 3,125,012, filed June 27, 1962.

The automatic exposure control system comprises a measuring instrument 14 of the galvanometer type having an output member 15 which is positioned relative to a diaphragm $f$-scale 16 in accordance with the photocell connected thereto and responsive to the light reflected from the subject or scene. A front wall 19 of the camera 10 is provided with openings in which a photocell 17 and a photocell 18 are mounted in a well-known manner. Although the photocells 17 and 18 are shown diagrammatically as being arranged on opposite sides of the camera objective 13, it is to be understood that such photocells can be located in any position on the front wall 19, or even as annular or arcuate cells arranged concentrically with respect to the optical axis of objective 13.

A selecting means 20 in the form of a double-pole, double-throw switch is used to connect either photocell 17 or photocell 18 to the measuring instrument 14. When the movable element of switch 20 is in engagement with a pair of contacts 21, photocell 17 is connected by a pair of lines 22 via switch 20 to a pair of lines 23 connected to measuring instrument 14. Likewise, when the movable element of switch 20 is in engagement with a pair of contacts 24, photocell 18 is connected via a pair of lines 25, switch 20 and lines 23 to measuring instrument 14.

A source of nonvisible electromagnetic radiation, such as an infrared source of illumination, designated by the numeral 30, is energized by closing a switch 31 which is in series circuit with a battery 32 for energizing an infrared lamp 33. In order to exclude visible light from the field of the source 30, a filter 34 can be arranged in front of lamp 33.

A photoflash lamp 35, which is mounted in front of a reflector 36, is connected to contacts, not shown, that are closed in synchronism with the actuation of the camera shutter to energize the lamp 35 which is in series circuit with a battery 37, as is well known in the art.

For normal daylight operation of camera 10, switch 20 is positioned in engagement with contacts 21 so as to connect photocell 17 to the measuring instrument 14. The operator then directs the camera towards the subject or scene to be photographed and the light reflected from a scene or subject S and incident on photocell 17 energizes measuring instrument 14 so as to position output member 15 in relation to scale 16 as a function of the scene light. Depending on whether the exposure control system is manual or automatic, the operator will either adjust the diaphragm to an opening as indicated by scale 16 by means of a diaphragm actuating member, as described above, or will actuate a camera release 40 which actuates the shutter or which first establishes the diaphragm opening and then actuates the camera shutter. The manner in which the diaphragm opening is established will, of course, depend on the type of diaphragm structure in the camera. The operation in this instance for normal daylight exposure of a film F in the camera is the same as that known and disclosed in the art.

When the operator uses the same camera for flash operation, the switch 20 is moved into engagement with contacts 24 so as to connect photocell 18 to measuring instrument 14. The switch 31 is closed so as to energize the infrared lamp 33. Also, the reflector and lamp 35 will be connected to the camera shutter as is usual for a flash synchronizing system. When the subject to be photographed is illuminated with infrared light, the infrared light reflected from the subject S and incident on photocell 18 will result in output member 15 being positioned as a function of the infrared light incident on photocell 18. The diaphragm 11 can then be set manually in the same way as described above, or the release member 40 can be actuated to release the shutter or to establish a diaphragm opening and then release the shutter. With such actuation of release member 40, the shutter is actuated as well as lamp 35 to illuminate the subject with artificial visible light for exposing the film F in the usual way.

In order to vary the sensitivity of photocell 18, a resistor 38 is connected in series in one of lines 25 and a resistor 39 is connected across lines 25 to provide suitable attenuation of the output of photocell 18. The resistors 38 and 39 can be chosen so as to adjust the sensitivity of photocell 18 in accordance with a particular film speed, flash lamp and/or characteristics of the measuring instrument 14. While these resistors have been shown as being of fixed value, they may be made adjustable so as to readily vary the sensitivity of cell 18 in accordance with variances in the factors previously mentioned.

It can be readily appreciated that such infrared illumination of the subject to be photographed, the exposure control system need not be disabled and the subject is not aware of such illumination. As a result, such an automatic exposure control system can be used to advantage under conditions where it is otherwise impossible to measure the light value for obtaining an optimum exposure of the film. Also, such an automatic exposure control system can be used not only in conjunction with an adjustable diaphragm as disclosed and described hereinabove, but can also be used in conjunction with a camera shutter having a range of shutter speeds as with both a diaphragm and a shutter as disclosed in the above-mentioned U.S. patent application. Further, the infrared source of illumination can be broadly defined as nonvisible electromagnetic radiation, in which case the sensitivity of the photocell can be adjusted in accordance therewith. The invention, therefore, is not to be limited to the embodiment described herein, but is of a scope as defined by the appended claims.

We claim:

1. In a camera having a photoelectric exposure control system for regulating the exposure of film in said camera, said control system including an electrically energizable measuring instrument having an output member positionable as a function of the energization of said instrument, the combination comprising:
   a first source of illumination for illuminating the scene to be photographed with nonvisible electromagnetic radiation;
   a second source of illumination for illuminating said scene with visible light;
   a photocell responsive to radiation from said first source reflected from said scene for controlling the energization of said measuring instrument to position said output member as a function of said visible light reflected from said scene;
   exposure means adjustable in accordance with the position of said output member; and
   means for energizing said first and second sources of illumination.

2. In a camera having a photoelectric exposure control system for regulating the exposure of film in said camera, said control system including an electrically energizable measuring instrument having an output member positionable as a function of the energization of said instrument, the combination comprising:
   a first source of illumination for illuminating the scene to be photographed with nonvisible electromagnetic radiation;
   a second source of illumination energizable for illuminating said scene with visible light;
   a photocell responsive to said nonvisible radiation reflected from said scene for controlling the energization of said measuring instrument to position said output member as a function of said visible light reflected from said scene;
   exposure means adjustable in accordance with the position of said output member; and
   means for energizing said first and second sources of illumination seriatim.

3. In a camera having a photoelectric exposure control system for regulating the exposure of film in said camera, said control system including an electrically energizable measuring instrument having an output member positionable as a function of the energization of said instrument, the combination comprising:
   a first source of illumination for illuminating the scene to be photographed with nonvisible electromagnetic radiation;
   a second source of illumination energizable for illuminating said scene with visible light;
   a photocell responsive to said nonvisible radiation reflected from said scene for controlling the energization of said measuring instrument to position said output member as a function of said visible light reflected from said scene;
   exposure means including at least one exposure regulating device and means adapted to be moved, under manual control, for adjusting said device in accordance with the position of said output member; and
   means for energizing said second source of illumination in synchronism with the adjustment of said device.

4. A camera in accordance with claim 3 wherein said one exposure regulating device comprises a diaphragm adjustable to any one of a range of exposure apertures and including means adapted to be moved, under manual control, into engagement with said output member for sensing the position thereof, said sensing means being coupled to said diaphragm to adjust the latter as a function of said visible light reflected from said scene.

5. A camera in accordance with claim 3 wherein said one exposure regulating device comprises a shutter adjustable to any one of a range of shutter speeds and including means adapted to be moved, under manual control, into engagement with said output member for sensing the position thereof, said sensing means being positioned to establish the shutter speed as a function of said visible light reflected from said scene.

6. In a camera having a photoelectric exposure control system for regulating the exposure of film in said camera, said control system including an electrically energizable measuring instrument having an output member positionable as a function of the energization of said instrument, the combination comprising:
  a first photocell responsive to visible scene light for energizing said measuring instrument;
  a first source of illumination for illuminating the scene to be photographed with nonvisible electromagnetic radiation;
  a second source of illumination energizable for flash illumination of said scene with visible light;
  a second photocell responsive to said nonvisible radiation reflected from said scene for controlling the energization of said measuring instrument to position said output member as a function of said visible light reflected from said scene;
  means selectively movable, under manual control, between a first position in which said first photocell is connected to said measuring instrument and a second position in which second photocell is connected to said measuring instrument;
  exposure means including means adapted to be moved, under manual control, for adjusting and actuating said exposure means in accordance with the position of said output member; and
  means for energizing said second source of illumination in synchronism with the actuation of said exposure means when said movable means is in said second position.

7. A camera in accordance with claim 6 including means for adjusting the sensitivity of said second photocell in accordance with the characteristics of said measuring instrument.

8. A camera in accordance with claim 6 including means for adjusting the sensitivity of said second photocell in accordance with the speed of said film and the characteristics of said measuring instrument.

9. A camera in accordance with claim 7 wherein said adjusting means comprises attenuating resistors in the circuit of said second photocell.

10. A camera in accordance with claim 6 wherein said movable means comprises a manually operable switch means.

11. A camera in accordance with claim 6 including filter means arranged in front of said first source of illumination for excluding visible light from the field thereof.

12. In a camera having a photoelectric exposure control system for regulating the exposure of film in said camera, said control system including an electrically energizable measuring instrument having an output member positionable as a function of the energization of said instrument, the combination comprising:
  a first photocell responsive to visible scene light for energizing said measuring instrument;
  a first source of illumination for illuminating the scene to be photographed with nonvisible electromagnetic radiation;
  a second source of illumination energizable for flash illumination of said scene with visible light;
  a second photocell responsive to said nonvisible radiation reflected from said scene for controlling the energization of said measuring instrument to position said output member as a function of said visible light reflected from said scene;
  attenuating means in the circuit of said second photocell for adjusting the sensitivity thereof in accordance with the speed of said film and the characteristics of said measuring instrument;
  switch means selectively movable, under manual control, between a first position in which said first photocell is connected to said measuring instrument and a second position in which said second photocell is connected to said measuring instrument;
  exposure means including means adapted to be moved, under manual control, for adjusting and actuating said exposure means in accordance with the position of said output member; and
  means for energizing said second source of illumination in synchronism with the actuation of said exposure means when said switch means is in said second position.

13. In a camera having a photoelectric exposure control system for regulating the exposure of film in said camera, said control system including an electrically energizable measuring instrument having an output member positionable as a function of the energization of said instrument, the combination comprising:
  a first photocell responsive to visible scene light for energizing said measuring instrument;
  a first source of illumination for illuminating the scene to be photographed with nonvisible electromagnetic radiation;
  a second source of illumination energizable for flash illumination of said scene with visible light;
  a second photocell responsive to said nonvisible radiation reflected from said scene for controlling the energization of said measuring instrument to position said output member as a function of said visible light reflected from said scene;
  attenuating means in the circuit of said second photocell for adjusting the sensitivity thereof in accordance with the speed of said film and the characteristics of said measuring instrument;
  switch means selectively movable, under manual control, between a first position in which said first photocell is connected to said measuring instrument and a second position in which said second photocell is connected to said measuring instrument;
  exposure means including a diaphragm adjustable to any one of a range of exposure apertures and including means adapted to be moved, under manual control, for adjusting said diaphragm and actuating said exposure means in accordance with the position of said output member; and
  means for energizing said second source of illumination in synchronism with the actuation of said exposure means when said switch means is in said second position.

14. In a camera having a photoelectric exposure control system for regulating the exposure of film in said camera, said control system including an electrically energizable measuring instrument having an output member positionable as a function of the energization of said instrument, the combination comprising:
  a first photocell responsive to visible scene light for energizing said measuring instrument;
  a first source of illumination for illuminating the scene to be photographed with nonvisible electromagnetic radiation;
  a second source of illumination energizable for flash illumination of said scene with visible light;
  a second photocell responsive to said nonvisible radiation reflected from said scene for controlling the energization of said measuring instrument to position said output member as a function of said visible light reflected from said scene;
  attenuating means in the circuit of said second photocell for adjusting the sensitivity thereof in accordance with the speed of said film and the characteristics of said measuring instrument;
  switch means selectively movable under manual control, between a first position in which said first photocell is connected to said measuring instrument and a second position in which said second photocell is connected to said measuring instrument;

exposure means including a shutter adjustable to any one of a range of shutter speeds and including means movable, under manual control, for establishing one of said shutter speeds in accordance with the position of said output member; and means for actuating said shutter and energizing said second source of illumination in synchronism when said switch means is in said second position.

15. A camera in accordance with claim 12 wherein said first source of illumination illuminates the subject to be photographed with infrared light.

16. A camera in accordance with claim 12 including filter means arranged in front of said first source of illumination for excluding visible light from the field thereof.

References Cited in the file of this patent

UNITED STATES PATENTS

| | | |
|---|---|---|
| 1,925,355 | Whitson | Sept. 5, 1933 |
| 3,031,939 | Noack | May 1, 1962 |
| 3,073,226 | Greger | Jan. 15, 1963 |